(12) United States Patent
Misu et al.

(10) Patent No.: US 11,207,971 B2
(45) Date of Patent: Dec. 28, 2021

(54) VEHICLE DRIVE DEVICE

(71) Applicant: AISIN SEIKI KABUSHIKI KAISHA, Kariya (JP)

(72) Inventors: Takahiro Misu, Kariya (JP); Satoru Tanaka, Anjo (JP)

(73) Assignee: AISIN SEIKI KABUSHIKI KAISHA, Kariya (JP)

( * ) Notice: Subject to any disclaimer, the term of this patent is extended or adjusted under 35 U.S.C. 154(b) by 11 days.

(21) Appl. No.: 16/916,490

(22) Filed: Jun. 30, 2020

(65) Prior Publication Data

US 2021/0001712 A1    Jan. 7, 2021

(30) Foreign Application Priority Data

Jul. 3, 2019    (JP) .............................. JP2019-124348

(51) Int. Cl.
| | | |
|---|---|---|
| *B60K 17/04* | (2006.01) | |
| *B60K 7/00* | (2006.01) | |
| *F16H 57/04* | (2010.01) | |
| *F16H 1/28* | (2006.01) | |

(52) U.S. Cl.
CPC .......... *B60K 7/0007* (2013.01); *B60K 17/046* (2013.01); *F16H 1/28* (2013.01); *F16H 57/0486* (2013.01); *F16H 2001/2881* (2013.01)

(58) Field of Classification Search
CPC ....... B60K 7/0007; B60K 17/046; F16H 1/28; F16H 57/0486
See application file for complete search history.

(56) References Cited

U.S. PATENT DOCUMENTS

| | | | |
|---|---|---|---|
| 2008/0035407 A1* | 2/2008 | Murata ................ | B60K 17/043 180/308 |
| 2012/0309578 A1* | 12/2012 | Solka .................... | F16H 37/041 475/149 |

FOREIGN PATENT DOCUMENTS

| | | |
|---|---|---|
| JP | 4879191 B2 | 2/2012 |
| JP | 2017-163628 A | 9/2017 |
| WO | WO 2006/076321 A2 | 7/2006 |

\* cited by examiner

*Primary Examiner* — Derek D Knight
(74) *Attorney, Agent, or Firm* — Oblon, McClelland, Maier & Neustadt, L.L.P.

(57) ABSTRACT

A vehicle drive device includes an electric motor disposed in a wheel, a planetary gear mechanism, and a hub. The electric motor is configured to generate a drive force which drives the wheel. The drive force of the electric motor is transmitted to the planetary gear mechanism. The hub transmits a drive force of the planetary gear mechanism to the wheel. The planetary gear mechanism includes a pinion gear having a first pinion and a second pinion coaxial with the first pinion and having a smaller diameter than the first pinion, a fixed ring gear which engages with the first pinion, and a drive ring gear which engages with the second pinion and transmits a drive force to the hub. The first pinion is disposed at a position away from an end portion of the stator core in a direction in which a rotation center axis of the wheel extends.

6 Claims, 7 Drawing Sheets

VEHICLE DRIVE DEVICE

CROSS-REFERENCE TO RELATED APPLICATION

This application claims priority to Japanese Patent Application No. 2019-124348 filed on Jul. 3, 2019, incorporated herein by reference in its entirety.

BACKGROUND

1. Technical Field

The present disclosure relates to a vehicle drive device, and more particularly to a vehicle drive device in which an electric motor is disposed inside a wheel.

2. Description of Related Art

Conventionally, a so-called in-wheel motor type vehicle drive device in which an electric motor is disposed in a wheel is known (refer to, for example, Japanese Patent No. 4879191 (JP 4879191 B).

JP 4879191 B discloses a vehicle wheel hub drive system (an in-wheel motor type vehicle drive device) including an electric motor subassembly (an electric motor). The vehicle wheel hub drive system also includes a planetary gear subassembly and a hub bearing assembly. The vehicle wheel hub drive system is configured to rotate wheels by transmitting a drive force in the electric motor subassembly to the hub bearing assembly via the planetary gear subassembly.

The electric motor subassembly of Japanese Patent No. 4879191 includes a rotor and a stator. The stator is disposed to surround the rotor in a direction orthogonal to a rotation center axis of a wheel. The planetary gear assembly includes a planetary gear group having a first planetary gear and a second planetary gear. The first planetary gear has a larger diameter than that of the second planetary gear. The first planetary gear and the second planetary gear are disposed inside the stator in the direction orthogonal to the rotation center axis of the wheel.

SUMMARY

Here, in the vehicle wheel hub drive system disclosed in Japanese Patent No. 4879191, when a reduction gear ratio of each of the first planetary gear and the second planetary gear is increased in accordance with a vehicle, it is conceivable to further increase the diameter of the first planetary gear.

However, in the vehicle wheel hub drive system disclosed in Japanese Patent No. 4879191, since a size of the first planetary gears is limited by the stator due to the first planetary gears being disposed inside the stator, it is difficult to set the planetary gear group to have a desired reduction gear ratio. Further, since the stator also needs to have a larger diameter due to the larger diameter of the first planetary gear, there is also a disadvantage that the electric motor subassembly becomes large and complicated. As a result, in the vehicle wheel hub drive system, there is a problem that it is difficult to set the planetary gear group (a pinion gear) to have a desired reduction gear ratio while suppressing the electric motor subassembly (the electric motor) from becoming large and complicated.

The present disclosure provides an in-wheel motor type vehicle drive device which sets a pinion gear to have a desired reduction gear ratio while suppressing an electric motor from becoming large and complicated.

A vehicle drive device according to one aspect of the present disclosure includes an electric motor, a planetary gear mechanism, and a hub. The electric motor is disposed in a wheel of a vehicle, includes a stator having a stator core and a rotor, and is configured to generate a drive force which drives the wheel. The drive force of the electric motor is transmitted to the planetary gear mechanism. The hub transmits a drive force of the planetary gear mechanism to the wheel. The planetary gear mechanism includes a pinion gear having a first pinion and a second pinion coaxial with the first pinion and having a smaller diameter than the first pinion, a fixed ring gear which engages with the first pinion, and a drive ring gear which engages with the second pinion and transmits a drive force to the hub. The first pinion is disposed at a position away from an end portion of the stator core in a direction in which a rotation center axis of the wheel extends.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Hereinafter, an embodiment according to the present disclosure will be described with reference to the drawings.

A configuration of an in-wheel motor type vehicle drive device 100 according to an embodiment will be described with reference to FIGS. 1 to 7.

Figure 1:
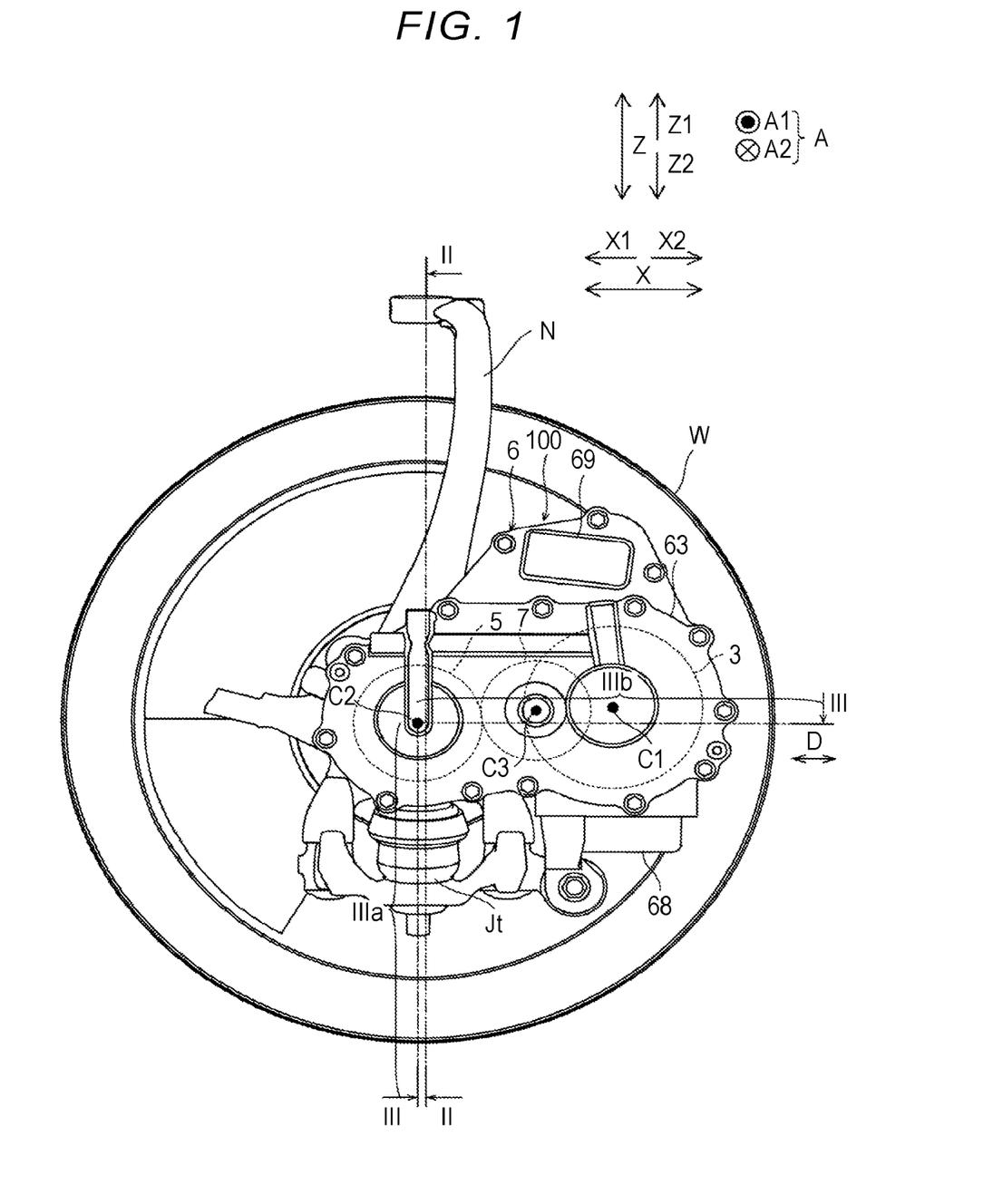
FIG. 1 is a front view from the A1 direction side of a state in which an in-wheel motor type vehicle drive device according to an embodiment is installed in a wheel.
Figure 2:
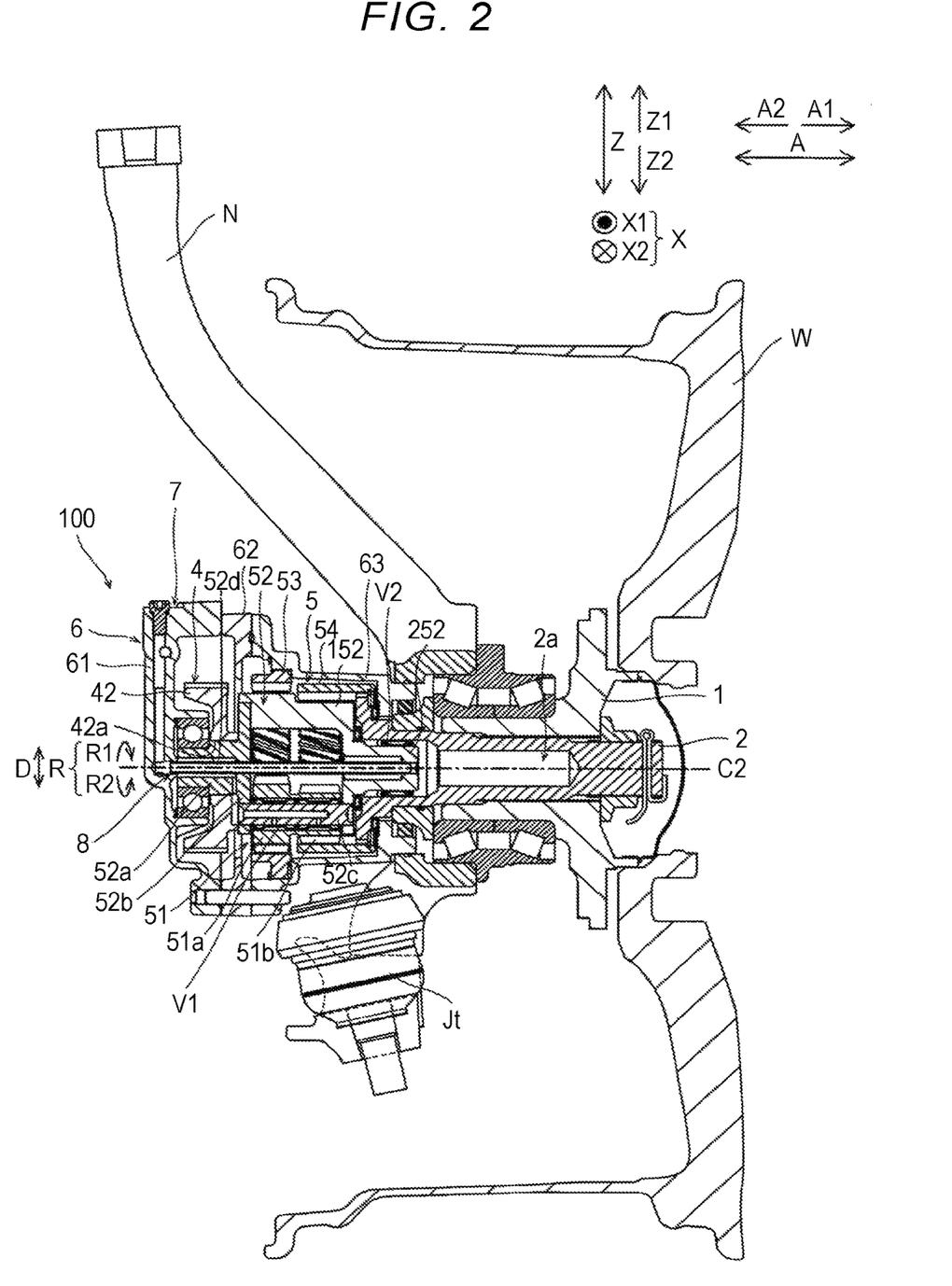
FIG. 2 is a sectional view along line II-II of FIG. 1.

As shown in FIGS. 1 and 2, the in-wheel motor type vehicle drive device 100 is configured to move the vehicle forward or backward by transmitting a drive force of an electric motor 3 disposed in a wheel W of a vehicle such as an automobile to a hub 1 to rotate the wheel W. That is, the in-wheel motor type vehicle drive device 100 is a device including a drive source which moves the vehicle forward or backward and a drive force transmission mechanism which transmits a drive force of the drive source.

Here, a direction in which a rotation center axis C2 of the wheel W extends is defined as an A direction (an axial direction), the wheel W side in the A direction is defined as an A1 direction, and the vehicle body side in the A direction is defined as an A2 direction. A direction orthogonal to the direction in which the rotation center axis C2 of the wheel W extends is defined as a D direction (a radial direction). A direction around the rotation center axis C2 of the wheel W is defined as an R direction (a circumferential direction).

One side of the R direction is an R1 direction, and the other side of the R direction is an R2 direction.

Further, a traveling direction of the vehicle is defined as an X direction, a forward direction of the X direction is defined as an X1 direction, and a backward direction of the X direction is defined as an X2 direction. A vertical direction of the vehicle is defined as a Z direction, an upward direction of the Z direction is defined as a Z1 direction, and a downward direction of the Z direction is defined as a Z2 direction.

In the following description, the in-wheel motor type vehicle drive device 100 in one wheel W of a plurality of wheels W installed on the X1 direction side and the X2 direction side of the vehicle will be described. The in-wheel motor type vehicle drive devices 100 disposed in the wheels W have the same configuration.

Here, at least a part of the in-wheel motor type vehicle drive device 100 is accommodated in the wheel W. The wheel W has a substantially cylindrical shape of which the A2 direction side is open. A knuckle N and a ball joint Jt are disposed in the wheel W. The knuckle N is a member which supports a tire wheel assembly including the wheels W, suspends the vehicle body in the vehicle and steers the tire wheel assembly. The ball joint Jt is a member which is installed in the knuckle N and serves as one end portion of a rotation center when the tire wheel assembly is steered.

Specifically, the in-wheel motor type vehicle drive device 100 includes a hub 1, a shaft 2, an electric motor 3, a transmission mechanism 4, a planetary gear mechanism 5, an accommodation member 6, an oil pump 7, and a lubrication pipe 8.

The hub 1 is configured to transmit a drive force of the shaft 2 to the wheels W. The hub 1 is fixed to the shaft 2 to be rotatable integrally with the shaft 2. The shaft 2 is configured to transmit a drive force of the planetary gear mechanism 5 to the hub 1. The shaft 2 is rotated by a torque of the electric motor 3 transmitted via the planetary gear mechanism 5. A lightening hole 2a is formed in the shaft 2. A part of the planetary gear mechanism 5 is disposed in the lightening hole 2a. A drive force of the electric motor 3 is transmitted to the planetary gear mechanism 5 via the transmission mechanism 4. That is, the planetary gear mechanism 5 is rotated by the torque of the electric motor 3 transmitted via the transmission mechanism 4.

Figure 3:
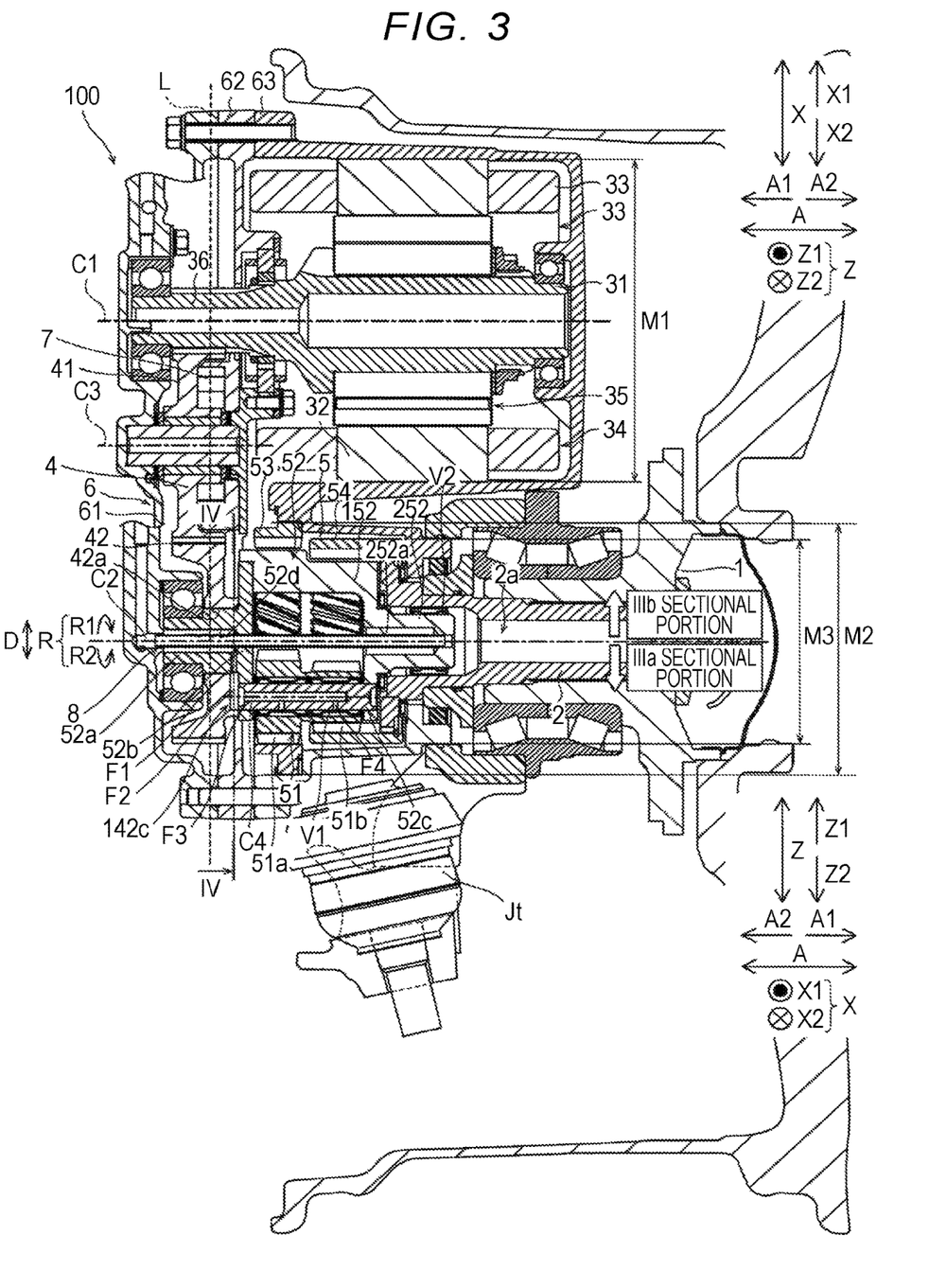
FIG. 3 is a sectional view along line of FIG. 1.

As shown in FIGS. 2 and 3, a rotation center axis C1 of the electric motor 3, the rotation center axis C2 of the planetary gear mechanism 5, and a rotation center axis C3 of the oil pump 7 are arranged and disposed in the D direction. The planetary gear mechanism 5, the oil pump 7, and the electric motor 3 are arranged in order from the inner side to the outer side in the D direction. Here, the electric motor 3 is disposed on the X2 direction side of the planetary gear mechanism 5 in the X direction. Further, the electric motor 3 is disposed separately from the planetary gear mechanism 5 in the D direction. Here, FIG. 3 is a drawing in which a portion 102a is disposed on the lower side of the drawing, a portion 102b is disposed on the upper side of the drawing in a sectional view along line 102-102 with reference to the rotation center axis C2, and they are connected at the rotation center axis C2.

The electric motor 3 is configured to generate a drive force for driving the vehicle. Specifically, the electric motor 3 is configured of an inner rotor type motor. That is, the electric motor 3 includes a motor shaft 31, a stator 34 having a stator core 32 and a stator coil 33, a rotor 35, and a drive gear 36.

The motor shaft 31 is configured to be rotatable around the rotation center axis C1 which extends in the A direction. The stator 34 is configured to rotate the motor shaft 31 around the rotation center axis C1. Specifically, the stator 34 has the stator core 32 and the stator coil 33. The stator coil 33 is configured to generate a rotating magnetic field which rotates the motor shaft 31 by being wound around the stator core 32. The drive gear 36 is provided at an end portion of the motor shaft 31 on the A2 direction side. The drive gear 36 has external teeth which engage with external teeth of an idler gear 41 of the transmission mechanism 4 which will be described later. A diameter of the drive gear 36 is smaller than a diameter of the idler gear 41 and a diameter of a driven gear 42 in the transmission mechanism 4 which will be described later.

(Transmission Mechanism)

The transmission mechanism 4 is configured to transmit the drive force of the electric motor 3 to the planetary gear mechanism 5. Specifically, the transmission mechanism 4 includes the idler gear 41 (an example of a "driven gear" in the claims) and a driven gear 42. The transmission mechanism 4 transmits the drive force of the electric motor 3 to the planetary gear mechanism 5 by connecting the electric motor 3 to the planetary gear mechanism 5. The idler gear 41 has external teeth which engage with the drive gear 36 and engage with the driven gear 42. The driven gear 42 has external teeth which engage with the external teeth of the idler gear 41. The driven gear 42 is rotatably installed on the planetary gear mechanism 5. A shaft press-fitting hole 42a into which an input side shaft portion 52a of a carrier 52 of the planetary gear mechanism 5 which will be described later is press-fitted is formed in the driven gear 42.

Here, the drive gear 36, the idler gear 41, and the driven gear 42 are disposed in a straight line in a direction (the D direction) orthogonal to a direction in which the rotation center axis C2 extends.

(Planetary Gear Mechanism)

The planetary gear mechanism 5 connects the driven gear 42 to the shaft 2. Specifically, the planetary gear mechanism 5 includes a plurality of (three) pinion gears 51, a carrier 52, a fixed ring gear 53, and a drive ring gear 54. Since all the pinion gears 51 have the same configuration, only one of them will be described below.

The pinion gear 51 is configured of a stepped pinion gear. The pinion gear 51 has a first pinion 51a and a second pinion 51b. The first pinion 51a and the second pinion 51b are integrally formed. The first pinion 51a and the second pinion 51b are formed to integrally rotate (spin) in the same direction around a rotation center axis C4.

The first pinion 51a is disposed coaxially with the second pinion 51b and has a larger diameter than the second pinion 51b. The first pinion 51a has external teeth which engage with the fixed ring gear 53. The second pinion 51b is disposed coaxially with the first pinion 51a and has a smaller diameter than that of the first pinion 51a. The second pinion 51b has external teeth which engage with the drive ring gear 54. The second pinion 51b is disposed on the A1 direction side of the first pinion 51a.

Figure 4:
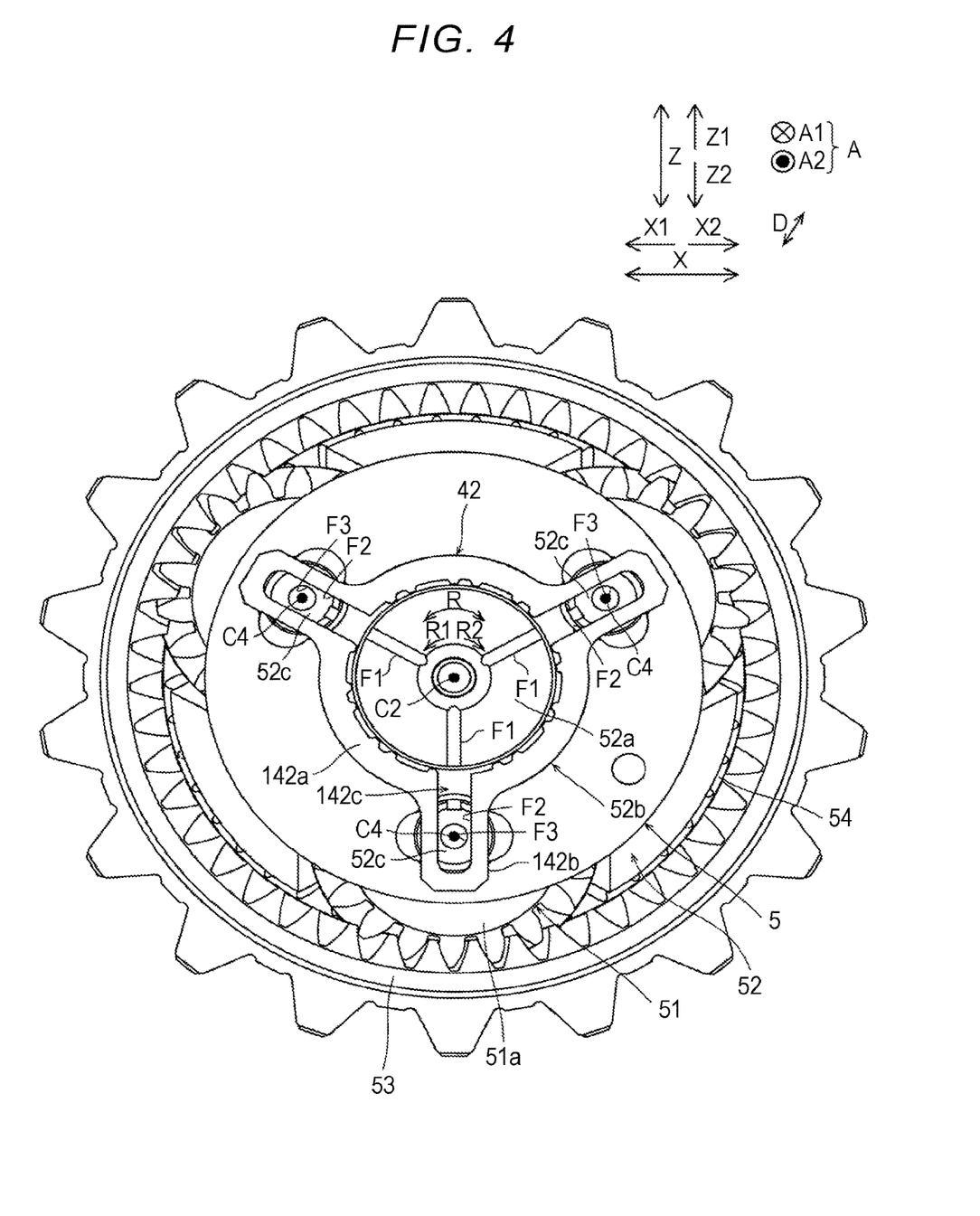
FIG. 4 is a sectional view along line IV-IV of FIG. 3.

As shown in FIGS. 3 and 4, the carrier 52 is configured to revolve the pinion gear 51 (that is, to rotate the pinion gear 51 around the rotation center axis C2) by the drive force of the electric motor 3. That is, the drive force of the electric motor 3 is transmitted to the carrier 52, and the first pinion 51a and the second pinion 51b are installed rotatably around the rotation center axis C4.

Specifically, the carrier 52 has an input side shaft portion 52a, a carrier portion 52b, and a plurality of (three) pinion shafts 52*c*. Here, the input side shaft portion 52*a* and the carrier portion 52*b* are disposed at positions offset in the A2 direction with respect to the ball joint Jt. Further, the carrier 52 has an installation portion 152 and a shaft portion 252. Here, the installation portion 152 extends from an end portion of the shaft portion 252 on the A2 direction side toward the A2 direction side. The pinion shaft 52*c* is installed on the installation portion 152.

The input side shaft portion 52*a* is disposed coaxially with the rotation center axis C2 of the planetary gear mechanism 5. The input side shaft portion 52*a* protrudes in the A2 direction from an end surface of the carrier portion 52*b* on the A2 direction side. The input side shaft portion 52*a* is press-fitted into the shaft press-fitting hole 42*a*. A pipe insertion hole 52*d* which passes through the input side shaft portion 52*a* in the A direction is formed in the input side shaft portion 52*a*. The pipe insertion hole 52*d* is larger than the lubrication pipe 8 in the direction orthogonal to the direction in which the rotation center axis C2 extends.

The pinion shafts 52*c* are installed in the carrier portion 52*b*. The pinion shafts 52*c* are arranged and disposed in the circumferential direction (the R direction) around the rotation center axis C2 at substantially equal angular intervals (intervals of about 120 degrees). Each of the pinion shafts 52*c* extends in the direction along the rotation center axis C2. A bearing V1 is disposed on each of the pinion shafts 52*c* at a position corresponding to the first pinion 51*a* and the second pinion 51*b* of the pinion gear 51. That is, each of the first pinion 51*a* and the second pinion 51*b* is installed on one of the pinion shafts 52*c* to be rotatable around the rotation center axis C4. Here, the bearing V1 is configured of a roller needle bearing.

As described above, the carrier 52 is installed in the transmission mechanism 4 and is configured so that the pinion gear 51 is rotatably installed.

The shaft portion 252 protrudes from the installation portion 152 in the A1 direction. The shaft portion 252 is inserted into the lightening hole 2*a*. Specifically, the shaft portion 252 is installed in an inner surface of the lightening hole 2*a* via a bearing V2. A pipe insertion hole 252*a* which passes through the shaft portion 252 in the A direction is formed in the shaft portion 252. The lubrication pipe 8 is inserted through the pipe insertion hole 252*a*. Here, the bearing V2 is configured of a needle bearing. The bearing V2 may be configured of a bearing other than the needle bearing.

The driven gear 42 has a driven gear central portion 142*a* and a plurality of (three) protruding portions 142*b*. The protruding portions 142*b* are disposed radially when seen from the A2 direction side. Each of the protruding portions 142*b* extends in a direction orthogonal to the rotation center axis C2. The protruding portions 142*b* are arranged at substantially equal angular intervals (intervals of about 120 degrees) in the circumferential direction (the R direction) around the rotation center axis C2. A long hole, which will be described later, that passes therethrough in the A direction and extends in the D direction is formed in each of the protruding portions 142*b*.

Specifically, an oil guide path 142*c* includes a plurality of (three) first guide paths F1, a plurality of (three) second guide paths F2, a plurality of (three) third guide paths F3, and a plurality of (three) fourth guide paths F4.

Each of the first guide paths F1 is formed radially when seen from the A2 direction side, like the protruding portions 142*b*. Each of the first guide paths F1 is formed as a through hole which extends in the D direction in the input side shaft portion 52*a*. Each of the first guide paths F1 is formed at an end portion of the input side shaft portion 52*a* on the A1 direction side.

Each of the second guide paths F2 is formed radially when seen from the A2 direction side, like the protruding portions 142*b*. Each of the second guide paths F2 is formed in each of the protruding portions 142*b* in the D direction. Each of the second guide paths F2 is formed as a long hole of each of the protruding portions 142*b* which passes therethrough in the A direction and extends in the D direction.

Each of the third guide paths F3 is formed inside each of the pinion shafts 52*c*. Each of the third guide paths F3 extends in the A direction. Each of the fourth guide paths F4 is formed inside each of the pinion shafts 52*c*. The fourth guide path F4 extends from the third guide path F3 in a direction orthogonal to the A direction. The first guide path F1, the second guide path F2, the third guide path F3, and the fourth guide path F4 communicate with one another.

The fixed ring gear 53 engages with the first pinion 51*a*. That is, the fixed ring gear 53 has internal teeth which engage with the external teeth of the first pinion 51*a*. The fixed ring gear 53 is installed in the accommodation member 6 not to rotate. The fixed ring gear 53 is installed in the accommodation member 6 by spline fitting. Since the fixed ring gear 53 is installed in the accommodation member 6 not to rotate, the fixed ring gear 53 does not rotate in the direction in which the rotation center axis C2 extends (the direction A).

The drive ring gear 54 is configured to engage with the second pinion 51*b* and to transmit the drive force to the hub 1. That is, the drive ring gear 54 has internal teeth which engage with the external teeth of the second pinion 51*b*. The drive ring gear 54 is installed at a portion of the shaft 2 on the A2 direction side by spline fitting. The drive ring gear 54 can rotate in the direction in which the rotation center axis C2 extends (the direction A).

(Positional Relationship Between Electric Motor and Planetary Gear Mechanism)

In the in-wheel motor type vehicle drive device 100 according to the embodiment, the first pinion 51*a* is arranged in the direction A away from the stator core 32 with respect to an end portion of the stator core 32. The stator core 32 and the first pinion 51*a* are disposed at positions offset from each other in the A direction. Specifically, the first pinion 51*a* is disposed at a position offset with respect to the stator core 32 in the A2 direction and the D direction. Here, at least a part of the first pinion 51*a* is offset from the ball joint Jt toward the A2 direction side in the A direction.

The stator core 32 and at least a part of the second pinion 51*b* are offset from each other in the A direction. Further, at least a part of the second pinion 51*b* overlaps the stator core 32 in the D direction. Here, the entire second pinion 51*b* overlaps the ball joint Jt in the D direction.

As described above, the planetary gear mechanism 5 is not disposed in the electric motor 3.

The planetary gear mechanism 5 and the electric motor 3 are connected to each other via the idler gear 41 and the driven gear 42 disposed in a straight line in the D direction and thus are disposed in substantially a U shape in a cross section in the D direction. That is, the rotation center axis C1 of the electric motor 3, the rotation center axis C2 of the planetary gear mechanism 5, and a straight line L in a direction in which the idler gear 41 and the driven gear 42 are disposed are provided in substantially a U shape.

Specifically, the electric motor 3 and the planetary gear mechanism 5 are spaced apart in the D direction and overlap each other at a position in the A direction, and the rotation center axis C1 of the electric motor 3 and the rotation center axis C2 of the planetary gear mechanism 5 are spaced apart and disposed in parallel. In addition, the electric motor 3 and the planetary gear mechanism 5 are connected to each other via the transmission mechanism 4 on the A2 direction side.

The fixed ring gear 53 is disposed at a position offset from the stator core 32 together with the first pinion Ma in the A direction. That is, a predetermined space is provided in the A direction between an end portion of the fixed ring gear 53 on the A1 direction side and an end portion of the stator core 32 on the A2 direction side. Further, at least a part of the drive ring gear 54 is disposed at a position overlapping the stator core 32 together with at least a part of the second pinion 51b in the D direction.

The fixed ring gear 53 has a size which curbs a distance between the rotation center axis C1 of the electric motor 3 and the rotation center axis C2 of the fixed ring gear 53 and can accommodate the electric motor 3 and the planetary gear mechanism 5 in a space in the wheel W in the D direction. That is, in the D direction, an outer diameter M2 of the fixed ring gear 53 is smaller than an outer diameter M1 of the electric motor 3. In the D direction, the outer diameter M2 of the fixed ring gear 53 is larger than an outer diameter M3 of the drive ring gear 54. Here, the outer diameter M2 of the fixed ring gear 53 indicates the maximum width of the planetary gear mechanism 5 in the D direction. The outer diameter M1 of the electric motor 3 indicates a width of the stator core 32 in the D direction. The outer diameter M3 of the drive ring gear 54 indicates the maximum width of the drive ring gear 54 in the D direction.

(Rotation of Output Shaft by Driving Electric Motor)

Here, rotation of the shaft 2 by driving the electric motor 3 will be described with reference to FIGS. 3 and 4.

First, as the rotor 35 of the electric motor 3 rotates, the drive gear 36 rotates. The input side shaft portion 52a of the carrier 52 rotates via the idler gear 41 and the driven gear 42 due to the rotation of the drive gear 36. The pinion shafts 52c rotate in the same direction around the rotation center axis C2 by rotating the carrier portion 52b integrally with the input side shaft portion 52a. Thus, the pinion gear 51 also rotates (revolves) integrally with the rotation of the pinion shafts 52c. As the pinion gear 51 revolves, the outer teeth of the first pinion 51a engage with the inner teeth of the fixed ring gear 53, and thus the first pinion 51a rotates in a direction opposite to the revolution.

The second pinion 51b also integrally rotates (spins) in the same direction due to the rotation of the first pinion 51a. At this time, the outer teeth of the second pinion 51b engage with the inner teeth of the drive ring gear 54, and thus the drive ring gear 54 rotates in a direction opposite to the rotation of the second pinion 51b. Thus, the shaft 2 rotates integrally with the drive ring gear 54 in the same direction.

(Reduction Gear Ratio of Planetary Gear Mechanism)

In the in-wheel motor type vehicle drive device 100, in order to rotate the wheel W at a desired rotation speed and a desired torque, a reduction gear ratio of each of the drive gear 36 and the driven gear 42 and a reduction gear ratio of each of the first pinion 51a and the second pinion 51b are set according to a rotation speed of the motor and a required drive force. Thus, the number of teeth of each of the fixed ring gear 53, the first pinion 51a, the second pinion 51b, and the drive ring gear 54 is set.

Here, the number of teeth of the drive gear 36, the number of teeth of the idler gear 41, and the number of teeth of the driven gear 42 are set in phase (a rotation speed and engaging of external teeth) so that vibration or the like does not occur.

In the in-wheel motor type vehicle drive device 100, a desired rotation speed and a desired torque are generated by combining the reduction gear ratio of each of the drive gear 36 and the driven gear 42 and the reduction gear ratio of each of the first pinion 51a and the second pinion 51b. Here, since the pinion gears 51 are disposed in the planetary gear mechanism 5, it is easier to secure a gear strength by adjusting the reduction gear ratio of each of the first pinion 51a and the second pinion 51b than in the case in which the reduction gear ratio of each of the drive gear 36 and the driven gear 42 is adjusted. That is, this is because, when the reduction gear ratio of each of the drive gear 36 and the driven gear 42 is adjusted, the number of teeth of the drive gear 36 and the number of teeth of the idler gear 41 increase as the number of teeth of the driven gear 42 increases, and thus the transmission mechanism 4 becomes larger. Accordingly, the reduction gear ratio of each of the first pinion 51a and the second pinion 51b is set to be higher than the reduction gear ratio of each of the drive gear 36 and the driven gear 42.

(Configuration Example of Planetary Gear Mechanism)

Figure 5:
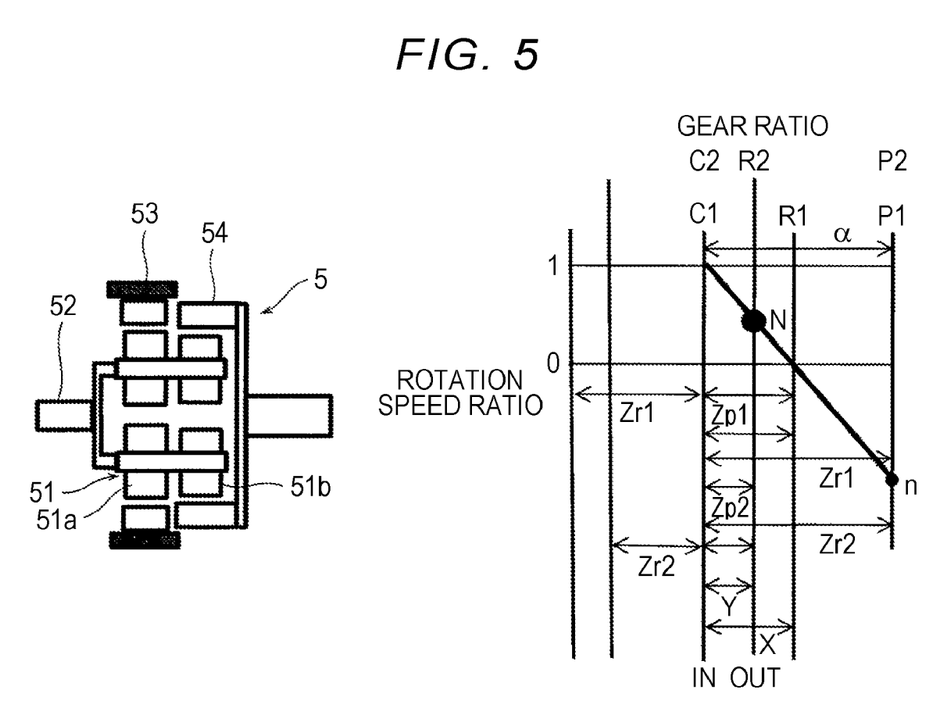
FIG. 5 is a schematic diagram showing a configuration example of a planetary gear mechanism of the in-wheel motor type vehicle drive device according to the embodiment.

Hereinafter, a configuration example of the reduction gear ratio of the planetary gear mechanism 5 will be described with reference to FIG. 5. FIG. 5 shows a simplified diagram of the planetary gear mechanism 5. Further, FIG. 5 shows a diagram in which a vertical axis indicates a rotation speed ratio (the reduction gear ratio) and a horizontal axis indicates a tooth number ratio. Here, in the diagram of FIG. 5, each of C1 and C2 indicates the pinion shaft 52c of the carrier 52. R1 and R2 indicate the fixed ring gear 53 and the drive ring gear 54, respectively. Zp1, Zp2, Zr1 and Zr2 indicate a distance corresponding to the number of teeth of the first pinion 51a, a distance corresponding to the number of teeth of the second pinion 51b, a distance corresponding to the number of teeth of fixed ring gear 53 and a distance corresponding to the number of teeth of drive ring gear 54, respectively. Here, the distance corresponding to the number of teeth indicates a distance in which an engaging gear rotates due to one rotation of a gear.

In the planetary gear mechanism 5, the revolution and rotation of the pinion gear 51 according to the rotation of the pinion shaft 52c of the carrier 52 are inputs to the planetary gear mechanism 5. Further, since the drive ring gear 54 is connected to the shaft 2, the rotation of the drive ring gear 54 becomes an output of the planetary gear mechanism 5.

"1" on the vertical axis indicates that the carrier 52 has made one rotation. "0" on the vertical axis indicates that when the carrier 52 makes one rotation, the fixed ring gear 53 does not rotate and thus the rotation is zero.

The first pinion 51a moves the distance Zr1 corresponding to the number of teeth of the fixed ring gear 53 when the carrier 52 makes one rotation. The second pinion 51b moves the distance Zr2 corresponding to the number of teeth of the fixed ring gear 53 by the revolution according to the rotation of the first pinion 51a when the carrier 52 makes one rotation. The fixed ring gear 53 does not rotate because it cannot rotate, but when the carrier 52 makes one rotation, it rotates by the distance Zp1 corresponding to the number of teeth of the first pinion 51a due to the rotation of the first pinion 51a. When the carrier 52 makes one rotation, the drive ring gear 54 rotates by the distance Zp2 corresponding to the number of teeth of the second pinion 51b due to the rotation of the second pinion 51b.

From the diagram of FIG. 5, the tooth number ratio between the first pinion 51a and the fixed ring gear 53 is expressed as X:α=Zp1:Zr1. Therefore, it is expressed as α=X*Zr1/Zp1. The tooth number ratio between the second pinion 51*b* and the drive ring gear 54 is expressed as Y:α=Zp2:Zr2. Therefore, it is expressed as α=Y*Zr2/Zp2. Based on this, Y/X=(Zp2/Zp1)*(Zr1/Zr2).

From the diagram of FIG. 5, a ratio between a moving distance of the fixed ring gear 53 for one rotation of the carrier 52 and a moving distance of the drive ring gear 54 for one rotation of the carrier 52 is expressed as X:(XY)=1:N. Accordingly, N is expressed by the following Equation (1).

$$N = 1 - \left(\frac{Zp2}{Zp1}\right) * \left(\frac{Zr1}{Zr2}\right) \quad (1)$$

The reduction gear ratio of the planetary gear mechanism 5 can be obtained as 1/N=6.3 by substituting values of Zr1=Zr2=45, Zp1=19, and Zp2=16 into Equation (1). Here, since the rotation speed ratio of the pinion gear 51 is N:n=(Zp1−Zp2):(Zr1−Zp1) from the diagram of FIG. 5, n=1.3 is obtained.

(Accommodation Member)

Figure 6:
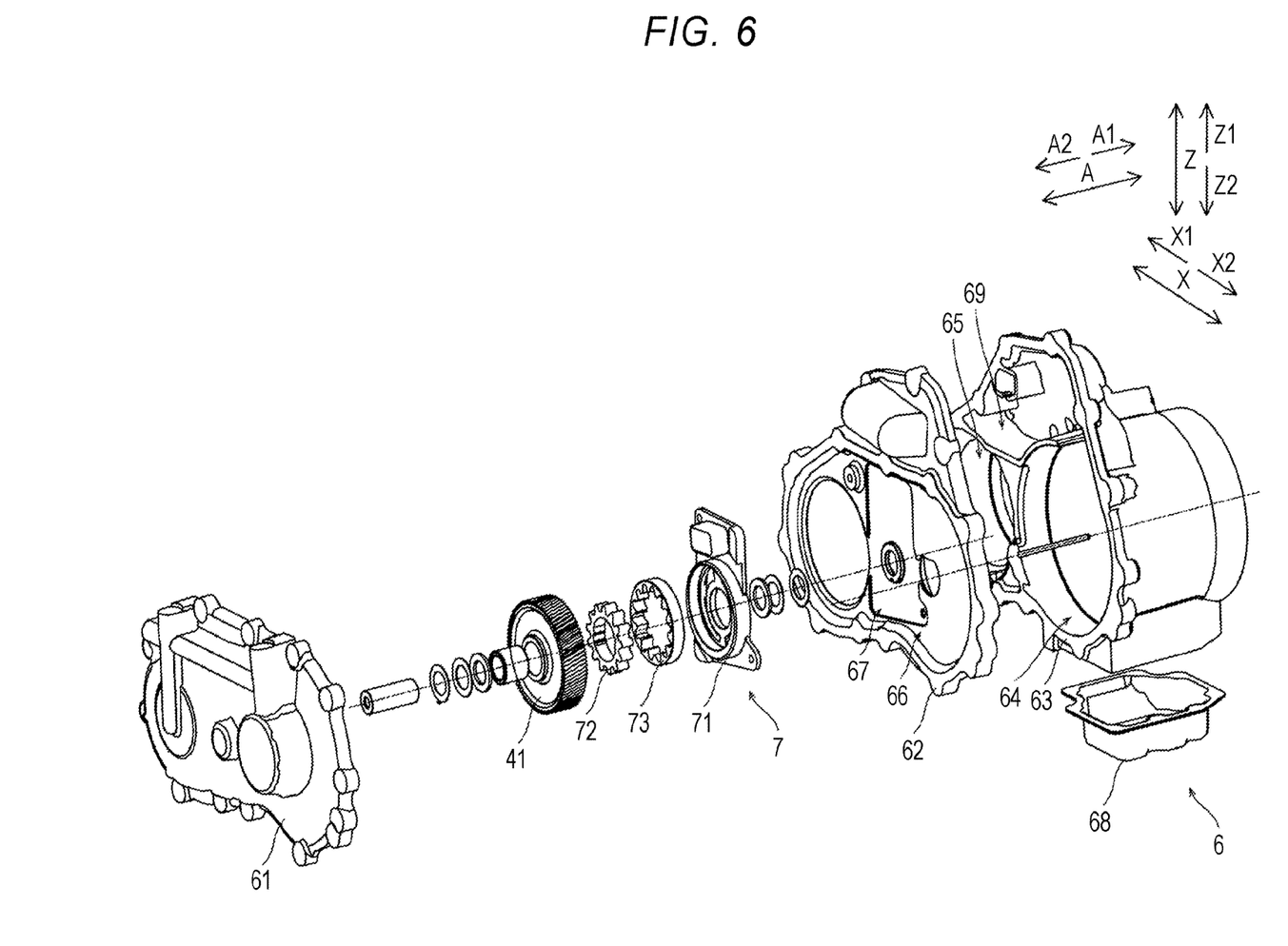
FIG. 6 is an exploded perspective view showing an oil pump mechanism of the in-wheel motor type vehicle drive device according to the embodiment.

As shown in FIG. 6, the accommodation member 6 is configured to accommodate the electric motor 3, the transmission mechanism 4, the planetary gear mechanism 5, and the oil pump 7. Specifically, the accommodation member 6 has a cover 61, a first case 62, and a second case 63.

The cover 61, the first case 62, and the second case 63 are arranged and disposed in order from the A2 direction side. A motor accommodation space 64 and a planetary mechanism accommodation space 65 are formed by the first case 62 and the second case 63. The electric motor 3 is accommodated in the motor accommodation space 64. The planetary gear mechanism 5 is accommodated in the planetary mechanism accommodation space 65. The motor accommodation space 64 and the planetary mechanism accommodation space 65 are adjacent to each other in the D direction.

A transmission mechanism accommodation space 66 and an oil pump accommodation space 67 are formed by the cover 61 and the first case 62. The transmission mechanism 4 is accommodated in the transmission mechanism accommodation space 66. The oil pump 7 is accommodated in the oil pump accommodation space 67. The oil pump accommodation space 67 is a part of the transmission mechanism accommodation space 66.

The accommodation member 6 has a lower oil tank 68 and an upper oil tank 69. The lower oil tank 68 is configured to store oil suctioned by the oil pump 7. The lower oil tank 68 is disposed on the Z2 direction side of the second case 63. The upper oil tank 69 is configured to temporarily store the oil discharged by the oil pump 7. The upper oil tank 69 is formed by aligning a concave portion of the second case 63 on the Z1 direction side with the first case 62.

(Lubrication Pipe)

Figure 7:
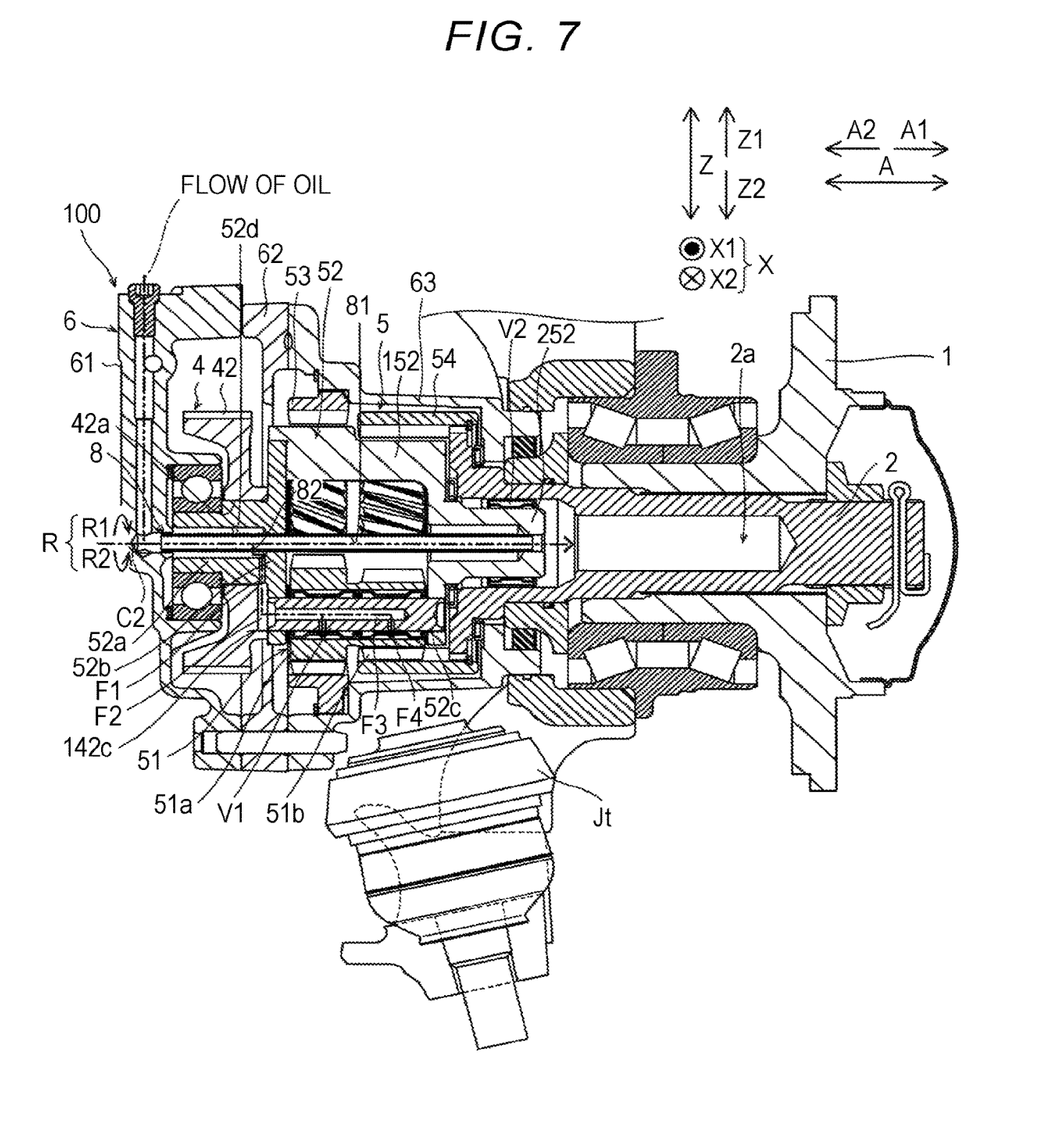
FIG. 7 is an enlarged sectional view in which a central portion of FIG. 1 in a Z direction is enlarged.

As shown in FIG. 7, the lubrication pipe 8 is disposed along the rotation center axis C2 and is configured to allow lubricating oil circulated by the oil pump 7 to circulate. Specifically, the lubrication pipe 8 extends in an extending direction of the shaft 2 at a center position of a region surrounded by the pinion gears 51. A plurality of (six) oil circulation holes 81 and an oil supply port 82 are formed in the lubrication pipe 8. Each of the oil circulation holes 81 is a through hole which passes through the lubrication pipe 8 in the direction A. The oil supply port 82 is configured to supply the oil flowing through the oil circulation hole 81 to the pipe insertion hole 52*d*. The oil supply port 82 passes through the lubrication pipe 8 in a direction orthogonal to the direction in which the rotation center axis C2 extends.

In the in-wheel motor type vehicle drive device 100, some of the oil supplied from the upper oil tank 69 to the planetary gear mechanism 5 is supplied to the oil circulation hole 81 of the lubrication pipe 8 and is supplied to the oil guide path 142*c* by a centrifugal force generated by the rotation of the carrier 52. Therefore, the oil is supplied to the bearings V1 installed on the pinion shafts 52*c*. Further, the oil which has flowed through the oil circulation hole 81 is supplied to the lightening hole 2*a* of the shaft 2 and is also supplied to the bearing V2 disposed inside the shaft 2. Then, the oil is supplied to the bearing V1 installed on the pinion shafts 52*c* and the bearing V2 disposed in the shaft 2, then supplied to a thrust bearing and an oil seal, and returned to the lower oil tank 68 by its own weight.

Effects of Present Embodiment

In the embodiment, the following effects can be obtained.

In the embodiment, as described above, the first pinion 51*a* and the second pinion 51*b* coaxial with the first pinion 51*a* and having a smaller diameter than the first pinion 51*a* are provided at the pinion gear 51. Then, the first pinion 51*a* is disposed in the direction A away from the stator core 32 with respect to the end portion of the stator core 32. Therefore, since the first pinion 51*a* having a diameter larger than that of the second pinion 51*b* is disposed at a position distant from the stator core 32, a size of the first pinion 51*a* is not limited by the stator 34, and thus the pinion gear 51 can be easily set to have a desired reduction gear ratio. Further, since it is not necessary to further increase the diameter of the stator core 32 as the diameter of the first pinion 51*a* is further increased, it is possible to suppress the electric motor 3 from becoming large and complicated. As a result, it is possible to easily set the pinion gear 51 to have a desired reduction gear ratio while suppressing the electric motor 3 from becoming large and complicated.

Further, in the embodiment, as described above, the electric motor 3 and the planetary gear mechanism 5 are spaced apart from each other in the D direction and overlap at a position in the A direction, and the rotation center axis C1 of the electric motor 3 and the rotation center axis C2 of the planetary gear mechanism 5 are spaced apart and disposed parallel to each other. Then, the electric motor 3 and the planetary gear mechanism 5 are connected via the transmission mechanism 4 on the A2 direction side. Therefore, since the electric motor 3 and the planetary gear mechanism 5 are disposed to be spaced apart from each other in the D direction, the electric motor 3 can be made smaller than in a case in which the planetary gear mechanism 5 is disposed in the electric motor 3. Further, it is possible to reduce a size of the in-wheel motor type vehicle drive device 100 in the A direction by connecting the electric motor 3 to the planetary gear mechanism 5 via the transmission mechanism 4, as compared with a case in which the electric motor 3 and the planetary gear mechanism 5 are coaxially arranged and connected to each other. As a result, since the size of the in-wheel motor type vehicle drive device 100 can be made smaller by making the electric motor 3 smaller, interference with other structures (the knuckle N, and the like) in the wheel W can be easily avoided.

Further, in the embodiment, as described above, the carrier 52 to which the drive force of the electric motor 3 is transmitted and in which the first pinion 51*a* and the second pinion 51*b* are rotatably installed is provided in the planetary gear mechanism 5. The lubrication pipe 8 which is disposed along the rotation center axis line C4 and through which oil flows is provided in the in-wheel motor type vehicle drive device 100. Therefore, since the oil can be supplied to the pinion gear 51 from the rotation center axis C4 via the lubrication pipe 8, the oil can be supplied to the entire pinion gear 51, unlike a case in which the oil is supplied to the pinion gear 51 from the side opposite to the rotation center axis C4. Further, since the drive force of the electric motor 3 is transmitted to the carrier 52, it is possible to suppress the planetary gear mechanism 5 from becoming large in the D direction as much that a sun gear is not disposed at a center position of the planetary gear mechanism 5. Further, since the pinion gear 51 is installed at the carrier 52, the torque transmitted from the electric motor 3 can be dispersed to the pinion gear 51 installed at the carrier 52. As a result, even when a larger torque is transmitted from the electric motor 3, it is possible to suppress the planetary gear mechanism 5 from becoming large to secure the strength. Further, since the drive force of the electric motor 3 is transmitted to the carrier 52, the in-wheel motor type vehicle drive device 100 can be made smaller as much that the sun gear is not disposed at the center position of the planetary gear mechanism 5. As a result, the in-wheel motor type vehicle drive device 100 can be easily installed in the wheel W.

In addition, in the embodiment, as described above, the fixed ring gear 53 is disposed at a position offset with respect to the stator core 32 together with the first pinion 51*a* in the A direction. Therefore, it is possible to increase a thickness of the accommodation member 6 in which the fixed ring gear 53 located on the outer peripheral side of the fixed ring gear 53 is installed in the D direction without interfering with the stator core 32. As a result, the strength required to install the fixed ring gear 53 in the accommodation member 6 can be secured.

Further, in the embodiment, as described above, the outer diameter M2 of the fixed ring gear 53 is smaller than the outer diameter M1 of the electric motor 3 in the D direction. Therefore, the fixed ring gear 53 can be easily disposed in an inner space from the electric motor 3 in the cylindrical space inside the wheel W other than the region in which the electric motor 3 is disposed. As a result, the in-wheel motor type vehicle drive device 100 can be easily accommodated in the wheel W.

Further, in the embodiment, as described above, the electric motor 3 is disposed on the rear side in the X2 direction with respect to the planetary gear mechanism 5 in the X direction. Accordingly, even when a load is applied from the X1 direction side, the electric motor 3 is less likely to receive the load, and thus the electric motor 3 can be protected more reliably.

Further, in the embodiment, as described above, the drive ring gear 54 is installed in the portion of the shaft 2 on the A2 direction side by spline fitting. Therefore, even when the hub 1 is deformed by an external force when the vehicle turns, the drive ring gear 54 can slide relative to the shaft 2, and thus it is possible to maintain engaging between the outer teeth of the second pinion 51*b* and the inner teeth of the drive ring gear 54.

Further, in the embodiment, as described above, the pinion gears 51 are installed at the carrier 52. Therefore, the torque transmitted from the electric motor 3 can be distributed to the pinion gears 51 installed at the carrier 52. As a result, even when a larger torque is transmitted from the electric motor 3, it is possible to suppress the planetary gear mechanism 5 from becoming large to secure the strength.

Modified Example

It should be considered that the embodiment disclosed this time is an exemplification in all points and is not restrictive.

For example, in the embodiment, although the example in which the first pinion 51*a* is disposed at a position offset in the A2 direction and the D direction with respect to the stator core 32 has been described, the embodiment is not limited thereto. The first pinion may be disposed only at a position offset in the A2 direction with respect to the stator core.

Further, in the embodiment, although the example in which the electric motor 3 is disposed on the X2 direction side of the planetary gear mechanism 5 in the X direction has been described, the embodiment is not limited thereto. The electric motor may be disposed outward from the planetary gear mechanism in the D direction.

Further, in the embodiment, although the example in which the driven gear 42 has the plurality of (three) protruding portions 142*b* has been described, the embodiment is not limited thereto. The driven gear preferably has three to four protruding portions but may have two or five or more protruding portions.

Further, in the embodiment, although the example in which the second guide paths F2 as a plurality of (three) long holes is formed in the driven gear 42 has been described, the embodiment is not limited thereto. The second guide paths according to the number of pinion shafts may be formed in the driven gear.

Further, in the embodiment, although the example in which the carrier 52 has the plurality of (three) pinion shafts 52*c* has been described, the embodiment is not limited thereto. The carrier may have the pinion shafts according to the number of protruding portions.

Further, in the embodiment, although the example in which the planetary gear mechanism 5 has the plurality of (three) pinion gears 51 has been described, the embodiment is not limited thereto. The planetary gear mechanism may have two or four or more pinion gears.

As described above, in the vehicle drive device according to the present disclosure, the first pinion and the second pinion coaxial with the first pinion and having a diameter smaller than that of the first pinion are installed. Additionally, the first pinion is disposed at a position away from the end portion of the stator core in the direction in which the rotation center axis of the wheel extends. Therefore, since the first pinion having a diameter larger than that of the second pinion is disposed at the position away from the end portion of the stator core, and thus the size of the first pinion is not limited by the stator core, the pinion gear can be easily set to have a desired reduction gear ratio. Further, since the first pinion having a diameter larger than that of the second pinion is disposed at the position offset from the stator core in the direction in which the rotation center axis of the wheel extends, and thus it is not necessary to further increase the diameter of the stator core as the diameter of the first pinion is increased, it is possible to suppress the electric motor from becoming large and complicated. As a result, it is possible to easily set the pinion gear to have a desired reduction gear ratio while suppressing the electric motor from becoming large and complicated.

In the vehicle drive device according to the aspect, a transmission mechanism including a driven gear which transmits the drive force of the electric motor to the planetary gear mechanism may be further provided, the electric motor and the planetary gear mechanism may be spaced apart from each other in the direction orthogonal to the direction in which the rotation center axis of the electric motor extends and may overlap in the direction in which the rotation center axis of the electric motor extends, the rotation center axis of the electric motor and the rotation center axis of the planetary gear mechanism may be spaced apart and disposed parallel to each other, and the electric motor and the planetary gear mechanism may be connected via a transmission mechanism on the side opposite to the hub side in the direction in which the rotation center axis of the wheel extends.

According to such a configuration, since the electric motor and the planetary gear mechanism are disposed to be spaced apart from each other in the direction orthogonal to the direction in which the rotation center axis of the electric motor extends, the electric motor can be made smaller as compared with a case in which the planetary gear mechanism is disposed in the electric motor. Further, since the electric motor and the planetary gear mechanism are connected to each other by the transmission mechanism, the in-wheel motor type vehicle drive device can be made smaller in the direction in which the rotation center axis of the wheel extends as compared with the case in which the electric motor and the planetary gear mechanism are coaxially arranged and connected. As a result, since the in-wheel motor type vehicle drive device can be made smaller, interference between the in-wheel motor type vehicle drive device and other structures (the knuckle and the like) in the wheel can be easily avoided.

In vehicle drive device according to the aspect, the lubrication pipe which circulates oil may be further provided, the planetary gear mechanism may include a carrier to which the drive force of the electric motor is transmitted and at which the first pinion and the second pinion are rotatably installed, and the lubrication pipe may be disposed along a rotation center axis of the carrier.

According to such a configuration, since oil can be supplied to the pinion gear from the rotation center axis side (the inner side in the radial direction) of the carrier via the lubrication pipe, unlike the case in which the oil is supplied to the pinion gear from the side (the outer side in the radial direction) opposite to the rotation center axis of the carrier, the oil can be supplied to the entire pinion gear. Further, since the drive force of the electric motor is transmitted to the carrier, it is not necessary to dispose a sun gear at the center position of the planetary gear mechanism. As a result, it is possible to suppress the planetary gear mechanism from becoming large in the direction orthogonal to the direction in which the rotation center axis of the wheel extends as much that the sun gear is not disposed at the center position of the planetary gear mechanism. Thus, the in-wheel motor type vehicle drive device can be made smaller. As a result, the in-wheel motor type vehicle drive device can be easily installed in the wheel.

In the vehicle drive device according to the aspect, the fixed ring gear may be disposed at a position offset with respect to the stator core together with the first pinion in the axial direction in which the rotation center axis of the wheel extends.

According to such a configuration, it is possible to increase the thickness of the member in which the fixed ring gear located on the outer peripheral side of the fixed ring gear is installed in the direction orthogonal to the axial direction without interfering with the stator core. As a result, it is possible to easily secure the strength required for installing a fixed ring in the member.

In the vehicle drive device according to the aspect, the outer diameter of the fixed ring gear may be smaller than the outer diameter of the electric motor in the direction orthogonal to the direction in which the rotation center axis of the wheel extends.

According to such a configuration, the fixed ring gear can be easily disposed in an inner space from the electric motor in the cylindrical space in the wheel other than the region in which the electric motor is disposed. As a result, the in-wheel motor type vehicle drive device can be easily accommodated in the wheel.

In the vehicle drive device according to the aspect, the electric motor may be disposed rearward from the planetary gear mechanism in the traveling direction of the vehicle.

According to such a configuration, even when a load is applied from the front side of the vehicle, the electric motor is less likely to receive the load, and thus the electric motor can be protected more reliably.

In addition to the vehicle drive device according to the correspondence, the following other configurations may also be considered.

In the vehicle drive device including the driven gear, the reduction gear ratio of each of the first pinion and the second pinion may be larger than the reduction gear ratio of the transmission mechanism.

According to such a configuration, since it is possible to secure the reduction gear ratio necessary for the in-wheel motor type vehicle drive device by simply adjusting the reduction gear ratio of each of the first pinion and the second pinion without increasing the size of the driven gear, it is possible to suppress the in-wheel motor type vehicle drive device from becoming large and complicated.

In the vehicle drive device including the driven gear, the transmission mechanism may further include a driven gear which connects the electric motor to the planetary gear mechanism, the electric motor may include a drive gear, and the drive gear, the driven gear, and the driven gear may be disposed on a straight line in the direction orthogonal to the direction in which the rotation center axis of the wheel extends.

According to such a configuration, as compared with a case in which the drive gear, the driven gear, and the driven gear are disposed offset from each other in the direction orthogonal to the direction in which the rotation center axis of the wheel extends, it is possible to suppress the in-wheel motor type vehicle drive device from becoming large and complicated.

In the vehicle drive device according to the aspect, at least a part of the second pinion may overlap the stator core in the direction orthogonal to the direction in which the rotation center axis of the wheel extends.

According to such a configuration, as compared with a case in which the first pinion and the second pinion are entirely offset in the direction orthogonal to the direction in which the rotation center axis of the wheel extends, it is possible to suppress the in-wheel motor type vehicle drive device from becoming large and complicated.

What is claimed is:

1. A vehicle drive device comprising:
    an electric motor which is disposed in a wheel of a vehicle, includes a stator having a stator core and a rotor, and is configured to generate a drive force which drives the wheel;
    a planetary gear mechanism to which the drive force of the electric motor is transmitted; and
    a hub which transmits a drive force of the planetary gear mechanism to the wheel,
    wherein the planetary gear mechanism includes a pinion gear having a first pinion and a second pinion coaxial with the first pinion and having a smaller diameter than the first pinion, a fixed ring gear which engages with the first pinion, and a drive ring gear which engages with the second pinion and transmits a drive force to the hub, and the first pinion is disposed at a position away from an end portion of the stator core in a direction in which a rotation center axis of the wheel extends.

2. The vehicle drive device according to claim 1, further comprising a transmission mechanism including a driven gear which transmits the drive force of the electric motor to the planetary gear mechanism, wherein the electric motor and the planetary gear mechanism overlap each other in a direction in which a rotation center axis of the electric motor extends, and the rotation center axis of the electric motor and a rotation center axis of the planetary gear mechanism are spaced apart and disposed parallel to each other, and the electric motor and the planetary gear mechanism are connected via the transmission mechanism on a side opposite to a hub side in the direction in which the rotation center axis of the wheel extends.

3. The vehicle drive device according to claim 1, further comprising a lubrication pipe configured to circulate oil, wherein the planetary gear mechanism includes a carrier to which the drive force of the electric motor is transmitted and at which the first pinion and the second pinion are rotatably installed, and the lubrication pipe is disposed along a rotation center axis of the carrier.

4. The vehicle drive device according to claim 1, wherein the fixed ring gear is disposed at a position offset with respect to the stator core together with the first pinion in an axial direction in which the rotation center axis of the wheel extends.

5. The vehicle drive device according to claim 1, wherein an outer diameter of the fixed ring gear is smaller than an outer diameter of the electric motor in a direction orthogonal to the direction in which the rotation center axis of the wheel extends.

6. The vehicle drive device according to claim 1, wherein the electric motor is disposed rearward from the planetary gear mechanism in a traveling direction of the vehicle.

* * * * *